United States Patent [19]

Slavik et al.

[11] Patent Number: 4,459,954

[45] Date of Patent: Jul. 17, 1984

[54] ENGINE GOVERNOR

[75] Inventors: William H. Slavik, Palos Hills; Roger A. Swanberg, Bensenville, both of Ill.

[73] Assignee: Hoof Products Co., Chicago, Ill.

[21] Appl. No.: 407,826

[22] Filed: Aug. 13, 1982

[51] Int. Cl.[3] .................... F02M 25/06; G05D 13/62; F02D 11/10

[52] U.S. Cl. .................................... 123/350; 123/352

[58] Field of Search ............... 123/350, 349, 351, 352; 73/112; 180/105 E

[56] References Cited

U.S. PATENT DOCUMENTS

| | | | |
|---|---|---|---|
| 2,499,263 | 2/1950 | Troy | 123/350 |
| 4,113,046 | 9/1978 | Arpino | 123/350 |
| 4,134,373 | 1/1979 | Kibler et al. | 123/352 |
| 4,196,466 | 4/1980 | Noddings et al. | 123/352 |
| 4,307,690 | 12/1981 | Rau et al. | 123/352 |
| 4,314,532 | 2/1982 | Payne | 123/350 |
| 4,354,467 | 10/1982 | Noddings et al. | 123/352 |
| 4,355,607 | 10/1982 | Blanay | 123/350 |
| 4,372,265 | 2/1983 | Kasiewicz | 123/352 |
| 4,387,681 | 6/1983 | Ikeura et al. | 123/350 |

*Primary Examiner*—Raymond A. Nelli

*Attorney, Agent, or Firm*—Willian, Brinks, Olds, Hofer, Gilson & Lione, Ltd.

[57] ABSTRACT

An engine governor is disclosed which includes a tachometer circuit, a control signal generator responsive to the tachometer circuit and to a threshold generating circuit, a pressure/temperature fault detector, and a logic circuit responsive to the control signal generating circuit and the fault detector. A driver circuit is responsive to the signal passed by the logic circuit. The driver circuit controls a proportional solenoid which in turn controls engine speed. The tachometer circuit of this invention utilizes a gated sample and hold circuit which is triggered in phase with the AC component of a voltage on an integrating capacitor in order to provide particularly fast response times. The disclosed governor is arranged in a modular fashion such that removable tachometer circuits can be plugged into a common driver circuit. The disclosed governor also includes an over/under speed detector circuit which operates first to reduce engine speed to idle when an over speed or under speed condition is sensed, and then to interrupt the operation of the ignition system of the engine after a selected time period.

19 Claims, 4 Drawing Figures

ENGINE GOVERNOR

BACKGROUND OF THE INVENTION

This invention relates to automatic engine governors of the type used to establish and maintain a desired speed of an engine, or a device such as a vehicle driven by an engine.

In the past, a wide range of mechanical engine governors have been used. In addition, limited use has been made of electronic engine governors using stepper or brush type motor drives. A need exists for an electronic engine governor which provides high speed response and is low in cost and reliable in operation. High speed governor response brings with it a number of important advantages.

High speed response allows the use of pulses taken from an engine ignition system to be used as primary engine speed data in many applications. With this approach, the need for magnetic transducers to provide high frequency pulses related to engine speed is eliminated in many applications, thereby facilitating installation of the engine governor and reducing installation costs. High speed governor response provides further advantages in terms of excellent engine speed control and limited reductions in engine speed when a load is applied. The reduction is governed engine speed occasioned by a load is termed the "droop" and low droop is important in many applications. For example, a governor which provides low droop can be used to keep an engine at a desired speed even under varying loads. This can be important, particularly where it is desired to keep the engine operating at or near its peak power speed. High speed response provides the further advantage of providing a more stable system for a given droop.

Some engine governors of the prior art have used shutdown mechanisms to shut off engine operation in the event of excessive engine speed. In many cases, these shutdown mechanisms act simply to interrupt engine ignition if an overspeed condition is sensed. This approach brings with it a sudden and complete loss in engine power. Such a loss in engine power can be dangerous in situations where, as for example, an operator driven vehicle is suddenly left completely without power in the middle of a roadway.

SUMMARY OF THE INVENTION

The present invention is directed to an improved engine governor which to a large extent overcomes the aforementioned disadvantages. The governor of this invention provides high speed response, and it can be embodied in a low cost, modular system which facilitates installation in varied applications and use. As described in detail below, a number of distinct improvements are incorporated in the preferred embodiments of the governor of this invention. These improvements relate to a tachometer circuit which provides high speed response, to a proportional solenoid actuating system which can be used to provide particularly low cost, reliable governors, to a modular arrangement of component parts of the governor which adapts the governor to easy installation and modification in the field, and to a novel circuit which reduces engine speed in response to an out of tolerance engine condition and provides staged intervention such that a sudden loss of engine power is avoided.

According to a first aspect of this invention, a governor with high speed of response is provided which includes means for generating a first signal having a parameter which varies as a function of the speed of a device driven by the engine. This first signal includes an AC ripple component which causes the instantaneous value of the first signal to wander about its mean value. Means are provided for repeatedly sampling the first signal in phase with the ripple component to generate a velocity signal having a ripple component substantially less than that of the first signal. This velocity signal is then used as an indication of engine speed by the governor.

This feature of the invention provides the important advantage that by significantly reducing the ripple component of the velocity signal as compared with the first signal, a significantly faster response time is provided. In operation, this feature of the invention allows the governor to function at extremely low engine speeds without excess ripple on the velocity signal. This aspect of the invention can be used to provide a governor with a speed of response significantly faster than that of the engine to provide the advantages of reduced hunting, increased stability, and reduced droop at all engine speeds.

According to a second aspect of this invention, an engine governor is provided which includes means for generating a modulated electronic driver signal indicative of governed engine speed. This driver signal is applied to a proportional solenoid which is coupled to means for controlling the engine speed in response to the solenoid. In alternate embodiments the coupling means can comprise a vacuum motor powered by a vacuum, the pressure of which is controlled by the proportional solenoid, or the coupling means can comprise a mechanical connection between the proportional solenoid and the engine. In either case, this aspect of the invention provides a particularly suitable, low cost, reliable actuator for modifying engine speed in response to an electronic driver signal.

This aspect of the invention provides the important advantage that a comparatively low cost, small, and simple proportional solenoid can be used to couple an electronic driver signal to an engine. Such solenoids are significantly less expensive to manufacture and simpler in operation than stepper or brush type motors used in certain electronic governors of the prior art.

According to a third aspect of this invention, an engine governor is provided which is modular in the sense that two or more means for generating intermediate electronic control signals can be coupled to a single logic circuit. This logic circuit acts to generate a control signal as a function of the one of the two intermediate control signals indicative of a lower engine speed. This control signal is then used to control the speed of the engine. At least one of the first and second means for generating intermediate control signals is mounted as a respective modular unit which is readily connected to and removed from the governor, and the logic circuit is operative to generate the control signal in a manner conducive to effective control of the speed of the engine, even in the absence one of the two means for generating intermediate control signals.

In alternate embodiments, the two intermediate control signals can either represent two different control functions or two measures of the same control function. An example of different control functions is where one signal is generated as a function of engine speed and the other is generated as a function of vehicle speed. An example of two measures of the same control function is where a primary engine speed control signal and a back up engine shutdown control signal are provided, as described below. In the preferred embodiment described below, the logic circuit comprises rectifiers such as diodes which act to pass the selected intermediate control signal to the driver circuit included in the governor.

This third aspect of the invention provides the important advantage that an engine governor can initially be mounted to an engine with only a single means for generating an intermediate control signal, such as means for generating an intermediate control signal in response to engine speed. Then, if it is desired at a later time to add a second means for generating an intermediate control signal which varies as a function of road speed or power take off speed, such second means can simply be connected to the preexisting engine governor. In this way, additional governor functions can be added subsequent to initial governor installation in a simple and reliable manner, without reworking the original governor. Another advantage of this feature of the invention is that it allows a modular system which can be used to reduce the total number of components needed to assemble engine governors for a wide range of engines, thereby reducing inventory as well as design costs.

According to a fourth feature of this invention, an engine governor is provided with a staged over/under speed detector which intervenes to reduce engine speed in response to an out of tolerance engine condition. The detector circuit of this invention first utilizes controlling means included in the governor to reduce the speed of the engine to a selected value in response to an out of tolerance engine condition. Means are also included which operate independently of the controlling means for shutting off the engine after the engine speed has been reduced.

In the preferred embodiment described below, the detector circuit utilizes the same driver circuit and actuator as the governor to bring the engine speed to idle in the event of an out of tolerance engine condition such as unusually high or low engine speed. The detector described in detail below then operates to interrupt engine ignition, thereby shutting off engine operation. This staged intervention of the detector provides the important advantage that ignition operation is not interrupted without warning. For a wide range of failures of the governor, the detector operates to bring engine speed to an idle, thereby allowing an operator to maneuver a truck off of a highway for example. The detector then operates to interrupt engine operation completely.

As will be apparent from the detailed description which follows, various ones of the above-described features of this invention can be used separately rather than in combination. For example, the circuit which provides high speed governor response can be used in governors which employ other types of over/under speed detectors, or which are not configured in a modular manner. However, the presently preferred embodiments of the governor of this invention employ each of the above-described features in combination, as described below.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
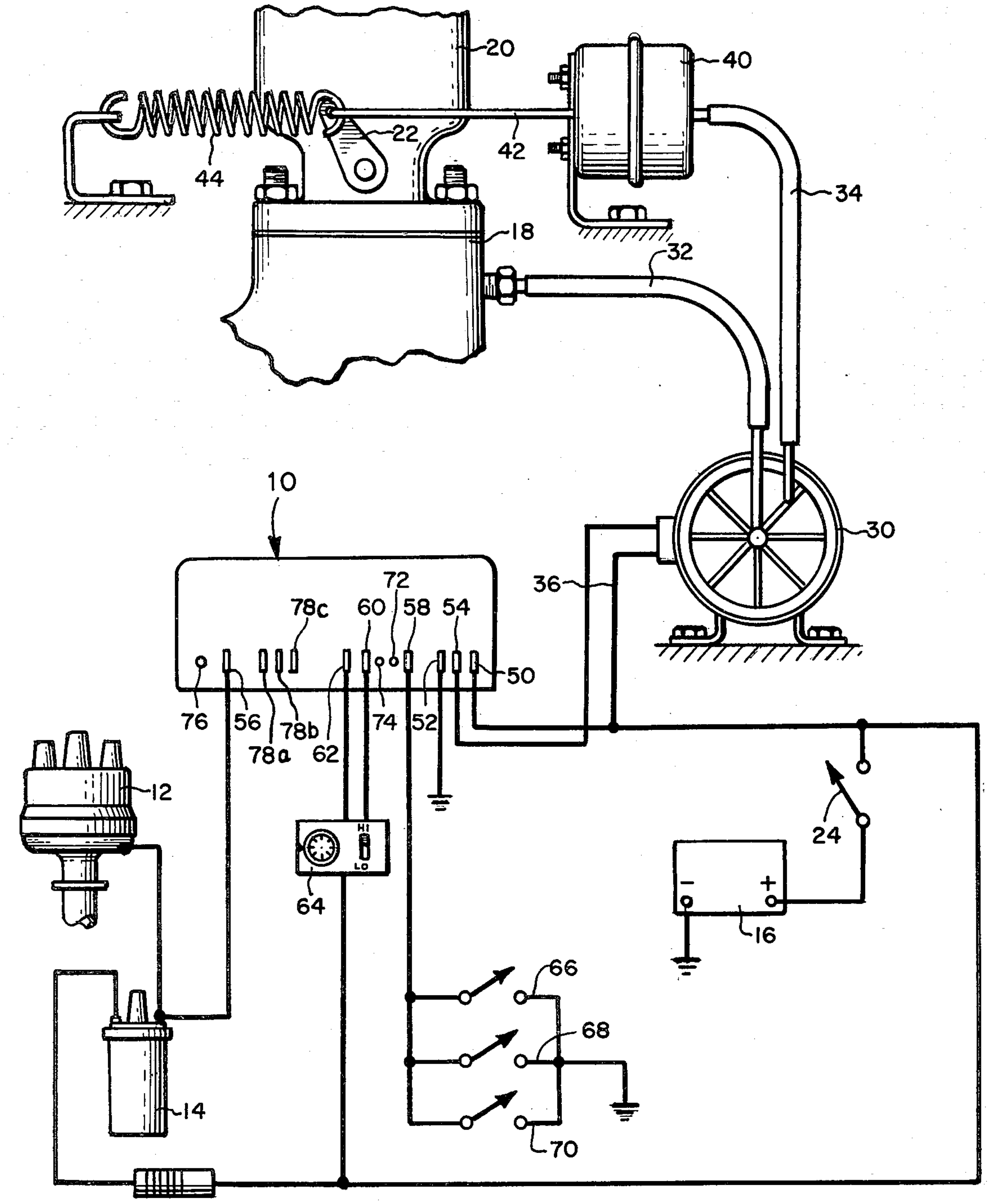
FIG. 1 is a schematic representation of a presently preferred embodiment of this invention installed on an internal combustion engine.

Turning now to the drawings, FIG. 1 shows a schematic representation of the manner in which a control unit 10 built in accordance with this invention can be connected to control the speed of an engine. The engine of this example is an internal combustion, spark ignition engine, and it includes a distributor 12 which is coupled to a coil 14 and a battery 16. An ignition switch 24 is placed in series between the battery 16 and the coil 14. The engine also includes an intake manifold 18, a carburetor 20, and a throttle 22 included in the carburetor 20. Each of these components of the engine is a standard component which does not per se form part of this invention. These components have therefore been shown and described schematically.

In addition to the control unit 10, the governor of this embodiment includes a vacuum solenoid valve 30 which is coupled by means of a vacuum hose 32 to the intake manifold 18 and by means of a vacuum hose 34 to a vacuum motor 40. The vacuum motor 40 is coupled by means of a link 42 to the throttle 22. A return spring 44 is mounted to bias the throttle 22 in the direction of engine idle. In operation, the return spring 44 acts in opposition to the vacuum motor 40 such that when the vacuum motor 40 exerts a greater force on the throttle 22 by means of the link 42, the throttle 22 moves to a more open position to increase engine speed.

The solenoid valve 30 is connected via a terminal 54 to the electronic control unit 10 and via a lead 36 to the ignition switch 24. The solenoid valve 30 is a proportional solenoid valve which is responsive to a modulated electronic driver signal generated by the electronic control unit 10 on terminal 54 to control the pressure applied to the vacuum motor 40 in a gradual and proportional manner. The nature of the driver signal on the terminal 54 will be described in detail below in connection with FIGS. 3*a* and 3*b*. Here, it is enough to state that the driver signal on terminal 54 is gradually and continuously modulated so as to control in a modulated fashion the vacuum applied via vacuum hose 34 to the vacuum motor 40, and thereby to control the force exerted by the vacuum motor 40 on the throttle 22 to determine the position of the throttle 22 to obtain the desired engine speed.

In this preferred embodiment, the solenoid valve 30 is a valve manufactured by Borg-Warner Company and identified as part no. X5070. The vacuum motor 40 of this preferred embodiment is manufactured by the Controls Division of Eaton Manufacturing Company and is identified as part no. DM52443. Because this embodiment utilizes the return spring 44, the above-described vacuum motor 40 has been modified by removing its internal return spring. The return spring 44 of this embodiment is 3½ inches in length and is characterized by a spring constant of one pound per inch of travel. Preferably, the spring tension on the throttle 22 should be adjusted such that at a high idle governed engine speed, the voltage supplied by the control unit 10 to the solenoid valve 30 is about ½ the voltage of the battery 16.

Of course, it should be understood that the precise designations of the solenoid valve 30, the vacuum motor 40 and the return spring 44 have been provided merely to define the presently preferred embodiment, and that a wide range of alternatives and variations can be employed in alternate embodiments. Furthermore, the control unit 10 can be coupled to a magnetic transducer arranged to provide a periodic signal indicative of engine speed. Such magnetic transducers will generally be used in connection with governors for diesel engines.

As shown in FIG. 1, the electronic control unit 10 includes a number of input and output terminals. These terminals will be described briefly in terms of function in connection with FIG. 1. Certain of these terminals will then be described in greater detail in connection with the electrical schematic of FIGS. 3*a* and 3*b*. As shown in FIG. 1, terminal 50 is connected to the ignition switch 24, terminal 52 is a ground terminal connected to ground, and terminal 54 is a control terminal connected to the solenoid valve 30. Terminal 56 is adapted to receive a signal having a frequency proportional to engine speed. Terminal 58 receives a temperature/pressure fault input signal. As described below, the control unit 10 operates to retard engine speed to idle in the event any one of the three switches 66, 68 and 70 closes to connect the terminal 58 to ground. In this embodiment, the switch 66 is a water temperature switch, the switch 68 is an oil temperature switch, and the switch 70 is an oil pressure switch. In each case, the switches 66, 68 and 70 are normally open and they close in the event a fault is sensed. The terminal 60 is a threshold input terminal which is adapted to receive a threshold signal indicative of the requested engine speed. Terminal 62 is a threshold output signal which can be connected to terminal 60 to couple an internal threshold signal generating circuit included in the control unit 10 to the threshold input terminal 60. As shown in FIG. 1, an external threshold generating circuit 64 can be provided which can be used to vary the requested engine speed remotely.

The electronic control unit 10 also includes a number of controls which can be adjusted to alter the operating characteristics of the control unit 10. Reference numeral 74 is used to designate a speed adjust control which is used to adjust the requested speed encoded in the threshold signal which is provided at terminal 62. Reference numeral 72 is used to designate a droop adjust control which is used to adjust the gain of the control unit 10 and thereby the precision with which measured engine speed is made to conform with requested engine speed. The control unit 10 includes an overspeed detection circuit, as will be explained in detail in connection with FIGS. 3*a* and 3*b*. Reference numeral 76 is used to designate an overspeed adjust control which is used to determine the engine speed at which the overspeed detection circuit is activated.

The control unit 10 is suitable for use either with four cylinder, six cylinder or eight cylinder engines and can be readily be calibrated for any one of these three types of engines by providing appropriate interconnections between the three control input terminals 78*a*, 78*b*, and 78*c*, as described in detail below. In this way a single, standardized control unit can readily be adapted for a wide variety of engines.

Figure 2:
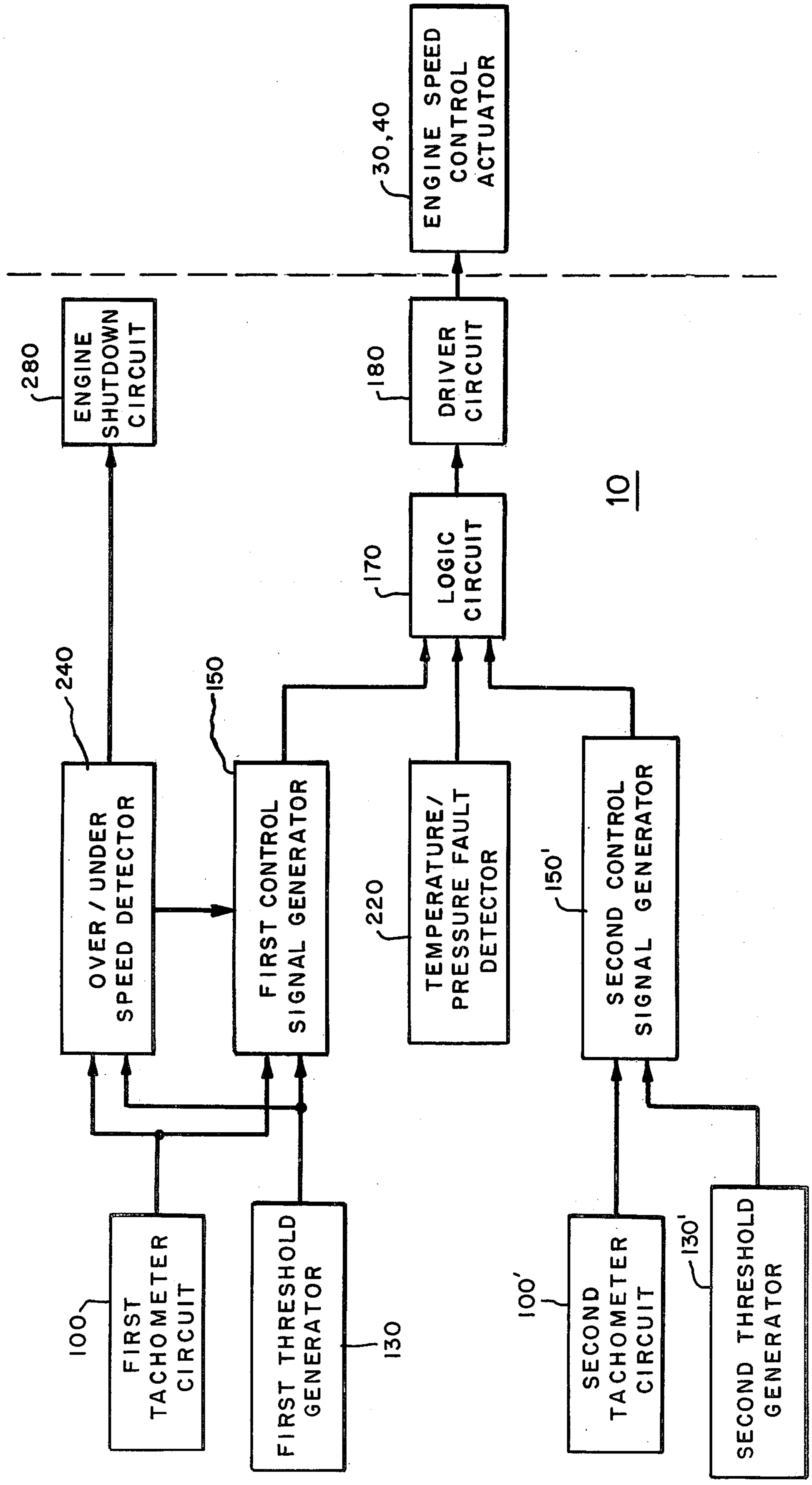
FIG. 2 is a block diagram of the control unit of the embodiment of FIG. 1.

FIG. 2 provides a block diagram of the control unit 10 as coupled to the engine speed control actuator which comprises the solenoid 30 and the vacuum motor 40. The control unit 10 includes a first tachometer circuit 100 which generates an analog velocity signal having an amplitude proportional to the measured velocity of a device driven by the engine. In this preferred embodiment, the first tachometer circuit 100 develops an analog velocity signal having a magnitude indicative of engine speed. This velocity signal is applied to a first control signal generator 150 as well as to an over/under speed detector 240. The first control signal generator 150 also receives an input from a first threshold generator 130. This first threshold generator 130 generates a threshold signal having an amplitude proportional to a requested speed. This first threshold signal is also applied to the over/under speed detector 240.

The first control signal generator 150 serves to generate a first intermediate control signal as a function of the difference between the velocity signal provided by the first tachometer circuit 100 and the first threshold signal provided by the first threshold generator 130. This first intermediate control signal is applied via a logic circuit 170 to a driver circuit 180. The driver circuit 180 generates a driver signal which is applied to the engine speed control actuator 30,40. This driver signal is generated in such a manner that the actuator 30,40 causes the engine speed to approach the value corresponding to the first threshold signal generated by the first threshold generator 130. These elements of the control unit 10 cooperate to provide the basic engine speed governing function.

The logic cirucit 170 also receives inputs from a temperature/pressure fault detector 220 as well as from a second control signal generator 150'. The second control signal generator 150' responds to a second velocity signal generated by a second tachometer circuit 100' and a second threshold signal generated by a second threshold generator 130'. In most respects, the first and second control signal generators 150, 150' are similar in operation, except that the second tachometer circuit 100' senses a different parameter than does the first tachometer circuit 100. For example, the second tachometer circuit 100' can be arranged to sense the ground speed of a vehicle or the speed of a power take off unit. Thus, in the case where the second tachometer circuit 100' senses ground speed, two intermediate control signals are applied to the logic circuit 170, one of which is generated as a function of measured engine speed while the other is generated as a function of measured vehicular speed.

The temperature/pressure fault detector 220 provides yet another input signal to the logic circuit 170. In this embodiment, the temperature/pressure fault detector 220 includes the three switches 66, 68, and 70, and operates to provide a grounded input to the logic circuit 170 in the event oil temperature, water temperature, or oil pressure moves outside of a predetermined range.

The logic circuit 170 acts to pass the single one of the three inputs to the logic circuit 170 from the elements 150, 150' and 220 which is indicative of the lowest engine speed to the driver circuit 180. The inputs from the elements 150, 150' are progressively varied, while the input from the element 220 merely goes to ground when a fault is detected. However, such a grounded input in effect requests engine idle, and is therefore indicative of engine speed. Thus, the logic circuit 170 acts as a gate which passes the most restrictive control signal to the driver circuit 180 for use in controlling the engine speed control actuator 30,40. Preferrably, the logic circuit 170 is arranged in such a manner that the entire system operates properly even in the event the second control signal generator 150' or the temperature/pressure fault detector 220 is disconnected from the logic circuit 170. Furthermore, the three elements 100', 130', and 150' are preferably packaged as a modular unit, separately from the rest of the control unit 10 such that this modular unit can readily be mounted on or removed from the control unit 10. In this way, a modular system is provided which operates properly at a basic level of engine control, yet can readily be supplemented with additional control functions.

The control unit 10 also includes an over/under speed detector 240 which receives input signals from the first tachometer circuit 100 and the first threshold generator 130 as described above. This over/under speed detector 240 monitors the velocity signal provided by the first tachometer circuit 100. In the event this velocity signal departs from the first threshold signal by an excessive amount, the over/under speed detector 240 causes the first control signal generator 150 to generate an intermediate control signal that results in the actuator 30,40 moving the engine throttle 22 to the idle position. After a predetermined time period, the over/under speed detector 240 enters a second mode of operation in which the detector 240 causes an engine shutdown circuit 280 to be enabled in order to interrupt operation of the engine independently of the elements 150, 170, 180, 30 and 40. In this preferred embodiment, the engine shutdown circuit 280 operates to interrupt operation of the ignition circuit of the engine.

The detailed schematic of FIGS. *3a* and *3b* is divided into blocks identified with the same reference numerals as those used in connection with the block diagram of FIG. 2. The following discussion will describe in detail the circuitry of FIGS. *3a* and *3b* in order to define the operation of this preferred embodiment in greater detail.

Turning now to FIGS. *3a* and *3b*, the first tachometer circuit 100 is coupled via the terminal 56 as described above to the points of the engine. Thus, a series of pulses is applied to the input terminal 56 at the rate of one pulse for each firing of any of the spark plugs of the engine. These pulses are applied as a trigger input to a pulse generating circuit 102, which in this embodiment is a type 4538 integrated circuit. The circuit 102 acts as a pulse shaping circuit to generate pulses of a selected width on the line 104 such that for each pulse applied to the input terminal 56 a corresponding pulse is applied via line 104 to an integrating capacitor 106.

The width of individual pulses on line 104 is determined by interconnections made between terminals 78*a*, 78*b*, 78*c*. In the event no external connections are made between any of these three terminals, the pulses on line 104 are 5 milliseconds in duration. In the event terminal 78*a* is connected to terminal 78*b*, then the pulses on line 104 are 3.75 milliseconds in duration. In the event that terminal 78*a* and 78*c* are interconnected, then the duration of the pulses on line 104 is 2.5 milliseconds. Of course, engines of four, six and eight cylinders have differing numbers of ignition pulses per engine revolution, and the system described above for varying the width of the pulses on line 104 allows the tachometer circuit 100 readily to be calibrated for an engine of any one of these three types.

Thus, the circuit 102 operates to charge the capacitor 106 via the pulses on line 104, which pulses have a frequency proportional to engine speed. The voltage on the capacitor 106 is buffered by the amplifier 108, the output of which is applied via the transmission gate 110 to a storage capacitor 112. An amplifier 114 is provided to buffer the voltage stored on the capacitor 112. The transmission gate 110 and the capacitor 112 cooperate to form a sample and hold circuit which acts to reduce the magnitude of ripple components of the voltage on the capacitor 106. In this preferred embodiment, the type 4066 integrated circuit of gate 110 includes four separate transmission gates which are coupled in parallel and triggered simultaneously.

The transmission gate 110 normally isolates the capacitor 112 from the amplifier 108 but is controlled to cause the voltage on the capacitor 112 to be set equal to the output voltage of the amplifier 108 when the gate 110 is triggered by the circuit 116. The circuit 116 is arranged to generate 100 microsecond trigger pulses on the line 118 such that the trigger pulses on line 118 occur at the trailing edges of the pulses on line 104.

In order to understand how the circuit 116 cooperates with the transmission gate 110 and the capacitor 112 to reduce the ripple component of the voltage stored on the capacitor 112 as compared with the voltage on the capacitor 106, it is important to recognize that the transmission gate 110 is operated in phase with the AC component of the voltage on the capacitor 106 as well as in phase with the sequence of pulses appearing on line 104. This is because the transmission gate 110 is triggered for a brief interval following each of the pulses on line 104. The capacitor 106 is charged during each of these pulses, and it discharges via line 104 into circuit 102 between pulses. Thus, the voltage on the capacitor 106 has an AC component which causes this voltage to wander about its mean value. By sampling the voltage on capacitor 106 in phase with this AC component, the voltage on capacitor 112 is made to have a small AC component as compared with that of the capacitor 106. By reducing the AC component of the signal on capacitor 112, the tachometer circuit 100 is provided with an extremely fast response time. The analog velocity signal on capacitor 112 is proportional to the frequency of pulses applied to the input terminal 56 and therefore proportional to engine speed. The amplifier 114 serves to buffer the voltage on the capacitor 112, and the analog velocity signal on line 122 is therefore representative of measured engine speed. The signal on line 122 is proportional to engine speed and varies directly with engine speed.

The resistor 120 is provided as a safety feature to increase the charge on capacitor 112 gradually in the event of a failure in the tachometer circuit 100. By thereby biasing the voltage on capacitor 112 towards higher voltages, the tachometer circuit 100 insures that many failures of the tachometer circuit 100 result in a measured engine speed being higher than actual engine speed, a condition which tends to cause a closing of the throttle 22.

Of course, it should be understood that a number of variations in the tachometer circuit 100 can be made without departing from the spirit of this invention. The circuit 116 can be used to trigger the transmission gate 110 at other phase angles of the pulses on line 104, or the circuit 116 can be triggered by the input signal on terminal 56 and the circuit 102 can be triggered by the output of the circuit 116. Alternately, the transmission gate 110 can be triggered at the leading edge of every one of the pulses on line 104, or the circuit 102 can be used to discharge the capacitor 106 during pulses and to charge the capacitor 106 between pulses such that the voltage on capacitor 112 varies inversely rather than directly with engine speed. Furthermore, a wide range of specific components can be used to provide the functions described above.

The first threshold generator 130 includes a chain of two resistors 132,134 and a potentiometer 136 coupled between supply voltage and ground. Varying the speed adjust control 74 causes the potentiometer 136 to vary the threshold voltage applied to the terminal 62. When the threshold voltage on the terminal 62 is applied directly to the terminal 60, this threshold voltage is applied via the line 138 back to the control unit 10. When an external threshold generator 64 is used as shown in FIG. 1, this generator 64 will typically contain circuitry similar to that shown in the threshold generator 130. The threshold generator 130 additionally includes a circuit 140 which acts to provide an internal engine RPM limit in order to insure that the threshold signal on line 138 never exceeds a preselected value.

The signals on lines 122 and 138 are applied as inputs to the control signal generator 150. The control signal generator 150 generates a control signal on line 152 which varies as a function of the discrepancy between the input signals on lines 122,138. The control signal generator 150 includes a feedback amplifier 154 which is coupled with a variable resistor 156. This variable resistor 156 is adjusted by means of the droop adjust control 72 of FIG. 1, which is used to adjust the gain of the control signal generator 150. When the variable resistor 156 is set to approximately 15,000 ohms, the control unit 10 provides a droop of less than five percent when used on four cylinder engines.

The control signal on line 152 is applied to a logic circuit 170. This logic circuit 170 receives a second input from the temperature/pressure fault detector 220. As shown in FIG. 3*b*, the fault detector 220 provides a signal at ground voltage on line 222 in the event a fault is detected in connection with oil pressure, oil temperature, or water temperature of the engine.

Figure 3A:
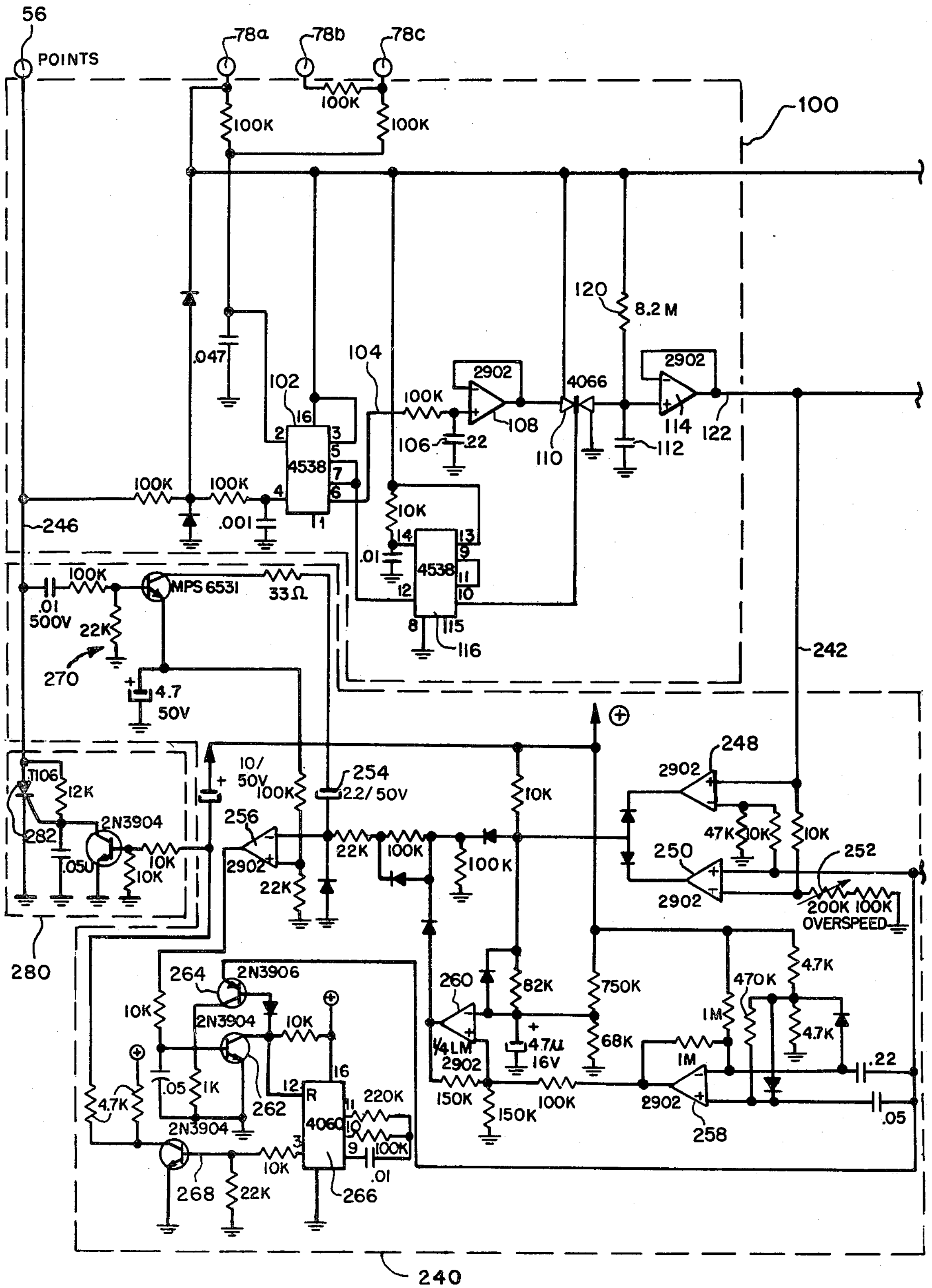
FIGS. 3*a* and 3*b* together make up a circuit diagram of the control unit of FIG. 2.
Figure 3B:
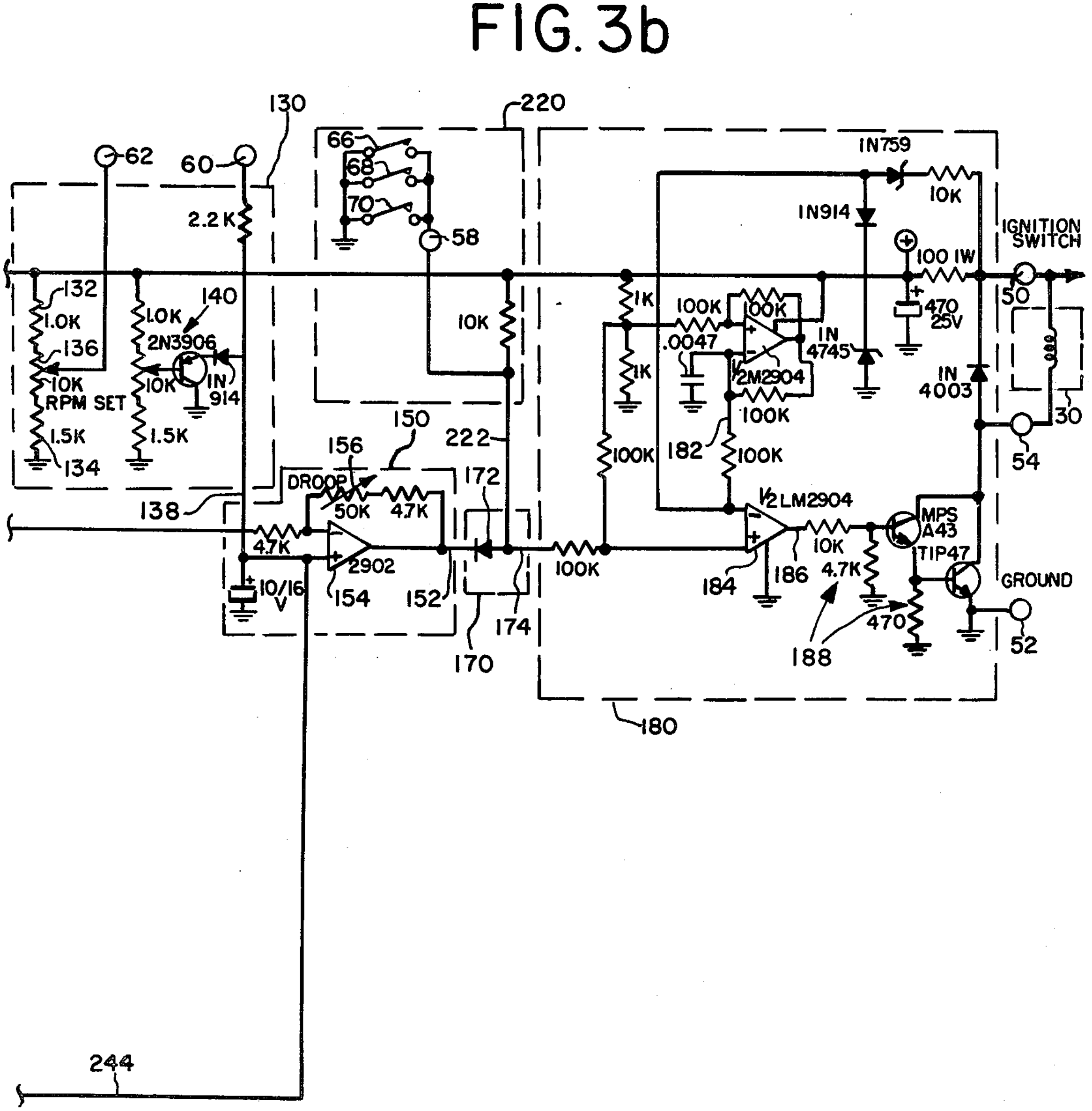

FIGS. 3*a* and 3*b* do not show the second tachometer circuit 100', the second threshold generator 130' or the second control signal generator 150'. In general, these circuits correspond closely to the circuits shown in FIG. 3*a* except that the second tachometer circuit 100' derives its input from a second device driven by the engine, such as a vehicle drive shaft or a power take off drive shaft, and component values have been adjusted for the frequency range of the input signal. In use, the intermediate control signal generated by the second control signal generator 150 is applied to the logic circuit 170 via a diode (similar to the diode 172) which is connected to the terminal 58 to provide diode gating of the two control signals.

The output of the logic circuit 170 on line 174 is applied as an input to the driver circuit 180. The driver circuit 180 includes an oscillator which generates a triangular signal on line 182 having a frequency of about 1 kilohertz. The driver circuit 180 also includes an amplifier 184 which generates a signal on line 186 having a frequency equal to that of the oscillator signal on line 182 and a pulse width which varies as a function of the voltage on line 174. A higher voltage on line 174 results in a higher pulse width signal on line 186. The signal on line 186 is applied as an input to a transistor pair 188. The greater the pulse width of the signal on line 186, the greater the average current passed by the transistor pair 188 and the lower the voltage on terminal 54. The solenoid valve 30 is arranged such that a lower voltage on the terminal 54 results in a greater vacuum applied to the vacuum motor 40. This in turn results in a greater force supplied on the throttle 22 and a higher engine speed. Conversely, a reduced pulse width of the signal on line 186 results in reduced engine speed. Thus, the driver circuit 180 generates a driver signal on terminal 54 which is a modulated electronic signal suitable for controlling the solenoid valve 30 in a proportional manner.

Turning now to the lower portion of FIG. 3*a*, the reference numeral 240 is used to designate the over/under speed detector. This detector 240 is connected via a line 242 to the velocity signal generated by the tachometer circuit 120 and via a line 244 to the threshold signal generated by the threshold generator 130. The over/under speed detector 240 is also connected to the input terminal 56 via the line 246.

The detector 240 includes two amplifiers 248,250 which operate to detect under speed and over speed conditions, respectively. The output of the amplifier 248 goes low when the signal on line 242 indicative of measured engine speed falls below eighty percent of the signal on line 244, indicative of requested engine speed. Similarly, the output of the amplifier 250 goes low whenever the signal on line 242 indicative of measured engine speed exceeds the signal on line 244 indicative of requested engine speed by an amount dependent on the setting of a variable resistor 252. The variable resistor 252 is adjusted by means of the overspeed adjust control 76, and the overspeed threshold can be set within the range of five to fifty percent greater than the requested speed indicated by the signal on line 244. When the outputs of either the amplifiers 248,250 stays low for a period of time sufficient to discharge the capacitor 254 (a period of about two seconds in this embodiment), the output of the amplifier 256 goes high.

Circuitry which includes the amplifiers 258 and 260 is provided to prevent the output of the amplifier 256 from going high during the period following changes in the signal on line 244. When the signal on line 244 indicative of the requested engine speed changes, the amplifier 258 generates a pulse which causes the amplifier 260 to maintain the output of the amplifier 256 low until the measured engine speed again becomes equal to the requested engine speed.

When the output of the amplifier 256 goes high, the transistors 262,264 are caused to conduct, thereby pulling the voltage on line 244 low. In effect, by pulling the voltage on line 244 low the threshold signal is reset to correspond to an engine idle condition. This causes engine speed to be reduced automatically to idle. Alternately, the transistors 262, 264 can be connected to pull the voltage on terminal 58 or the bases of the transistor pair 288 low.

At the point in time at which the voltage on line 244 is reduced, the reset signal to a counter 266 is pulled low as well. This allows the counter 266 to begin counting. After a preset period of time which is a function of the output of the counter connected to the line 268 as well as the counting rate of the counter, the counter 266 produces a signal on line 268 which is used to activate the engine shutdown circuit 280. In this preferred embodiment, the counter 266 is set up such that the engine shutdown circuit 280 is activated about one minute after the voltage on line 244 is pulled low. The circuit 270 is included in the over/under speed detector 240, and it operates to insure reliable initialization of the circuit during startup conditions. The engine shutdown circuit 280 includes an SCR 282 which when triggered serves to short the input terminal 56 and thereby the engine points to ground. Thus, when engine shutdown circuit 280 is activated the operation of the ignition system of the engine is interrupted.

From the foregoing, it should be apparent that the over/under speed detector 240 operates as a backup to the primary engine control system in a staged manner. If the measured engine speed falls below the requested engine speed by more than twenty percent, or if the measured engine speed exceeds the requested engine speed by a selectable amount between five and fifty percent, then the detector 240 operates first to command the control signal generator 150 to reduce engine speed to idle. This initial stage of operation of the over/under speed detector 240 does not completely interrupt engine operation, and it allows the operator of the engine to take necessary shutdown steps. For example, if the engine is a truck engine, the reduction of engine speed to idle allows the truck operator to use engine power to move the truck out of the roadway.

The over/under speed detector 240 then enters a second mode of operation in which the ignition system of the engine is shorted to ground. It should be noted that the second mode of operation operates largely independently of the first mode of operation in that the operation of the shutdown circuit 280 is independent of the control signal generator 150, the driver circuit 180 and the actuator 30,40.

In alternate embodiments, the detector 240 can operate to shut down engine operation immediately once a fault is detected. This alternate approach will generally be preferred for governors for unattended engines.

In FIGS. 3*a* and 3*b*, resistors have been identified by resistance in ohms and capacitors by capacitance in micro-farads. Integrated circuits have been identified by standard identification numbers and pin numbers have been provided where appropriate. All diodes are type IN914 and all resistors are 5%, ¼ watt unless otherwise indicated.

From the foregoing, it should be apparent that an engine governor has been described which is well suited to modular construction and which can be made to provide an extremely high speed of response. The disclosed embodiment utilizes a novel proportional solenoid to provide an electronic governor which can be built at a relatively low cost. Alternate embodiments of this invention can substitute a proportional solenoid of the type which is mechanically coupled to the throttle. For example, a proportional solenoid of the type manufactured and distributed by Thrombetta Corporation of Milwaukee, Wis. as part no. P-514 can be used. Such solenoids operate particularly well when the plunger and pole piece are provided with a twelve degree taper and an internal stop is provided to prevent the plunger from approaching the pole piece closer than one-quarter inch. By preventing complete contact between the plunger and pole piece, more proportional movement of the solenoid is obtained. It should be understood that as used throughout this application and the following claims, the term "proportional solenoid" is used in its broad sense to cover a range of solenoids, the action of which varies in a gradual, modulated manner as a function of the input signal. The term is not intended to be limited to solenoids in which solenoid action is strictly or directly proportional to the input to the solenoid.

As explained above, various features of this invention can be used separately rather than in combination with one another. For example, modular governors of the type described above can be designed utilizing actuators of the type designed above which do not utilize the novel tachometer circuit of this invention. Furthermore, a wide range of changes and modifications can be made to particular components of the governor described above. For example, the over/under speed detection circuit can be made to operate with fixed thresholds rather than thresholds that vary as a percentage of the requested engine speed. Of course, the actuator illustrated above can readily be modified to control a fuel pump or a throttle for use with engines utilizing fuel injection systems rather than carburetors, and governors built in accordance with this invention can be used in the widest rage of engines, whether used as prime movers for vehicles or as stationary power plants.

It should clearly be understood that the foregoing detailed description has been provided merely to illustrate one preferred form of this invention and that a wide range of alternative electronic circuits can be used to perform the disclosed functions. It is therefore intended that the foregoing detailed description be regarded as illustrative rather than limiting, and that it be understood that it is the following claims, including all equivalents, which are intended to define the scope of this invention.

We claim:

1. In an engine governor of the type comprising driver means, responsive to a control signal, for generating a driver signal, and actuator means, responsive to the driver signal, for controlling the speed of an engine, the improvement comprising:

means for generating a first signal having a parameter which varies as a function of the speed of a device driven by the engine, said first signal having an AC ripple component;

means for repeatedly sampling the first signal in phase with the ripple component to generate a velocity signal having a ripple component less than that of the first signal; and means for generating the control signal as a function of the velocity signal.

2. The invention of claim 1 wherein the means for generating the first signal comprises:

a first capacitor;

first means for modifying the charge on the first capacitor in a first direction by means of a sequence of pulses having a frequency which varies as a function of the velocity of the device driven by the engine; and second means for modifying the charge on the first capacitor in a second direction, opposed to the first direction, such that the instantaneous charge on the first capacitor is a dynamic balance between the modifications made by the first and second means.

3. The invention of claim 1 wherein the sampling means comprises:

a switch coupled to receive the first signal;

a storage device coupled to the switch; and means for repeatedly controlling the switch to apply the first signal to the storage device in phase with the ripple component of the first signal.

4. The invention of claim 2 wherein the sampling means comprises:

a switch coupled to receive the first signal;

a second capacitor coupled to the switch; and means for periodically controlling the switch in phase with the sequence of pulses to apply the first signal to the second capacitor.

5. In an engine governor of the type comprising driver means, responsive to a control signal, for generating a driver signal, and actuator means, responsive to the driver signal, for controlling the speed of an engine, the improvement comprising:

means for generating an input signal comprising a sequence of pulses having a frequency which varies as a function of the speed of a device driven by the engine;

an integrator;

means for applying the sequence pulses to the integrator to modify an analog signal stored by the integrator in the direction of higher speeds;

means for modifying the analog signal stored by the integrator in the direction of lower speeds at a rate chosen such that the analog signal varies as a function of the speed of the device;

a storage device;

means for selectively interconnecting the integrator and the storage device, said interconnecting means comprising a switch switchable between a first state, in which the instantaneous value of the analog signal is stored in the storage device, and a second state, in which the storage device is isolated from the integrator;

means for controlling the switch to the first state only at a selected phase angle of the sequence of pulses; and means for generating the control signal as a function of the signal stored by the storage device.

6. The invention of claim 5 wherein the selected phase angle corresponds to the leading edge of each of the pulses included in the sequence of pulses.

7. The invention of claim 5 wherein the selected phase angle corresponds to the trailing edge of each of the pulses included in the sequence of pulses.

8. The invention of claim 5 wherein the generating means comprises means for setting the pulse width of the pulses included in the sequence of pulses at any one of at least two predetermined values, each of which is adapted for use with engines having a respective number of cylinders.

9. The invention of claim 8 wherein the setting means comprises:

first, second, and third external contact points;

a first resistor connected between the first contact point and an output mode;

a second resistor connected between the second contact point and the output mode;

a third resistor connected between the second and third contact points; and means for selectively interconnecting two of the three contact points.

10. In an engine governor of the type comprising a means for generating a control signal indicative of the deviation of the speed of a device driven by an engine from a threshold value, and means responsive to the control signal for controlling the speed of the engine to cause the speed of the device to approach the speed corresponding to the threshold value, the improvement comprising:

first means for causing the controlling means to reduce the speed of the engine to a selected value in response to an out of tolerance engine condition; and second means, independent of the controlling means, for shutting off the engine at a selected time interval after the first means has caused the controlling means to reduce the speed of the engine.

11. The invention of claim 10 wherein the out of tolerance engine condition is excessively high engine speed.

12. The invention of claim 10 wherein the out of tolerance engine condition is excessively low engine speed.

13. The invention of claim 10 wherein the engine comprises an ignition system and the means for shutting off the engine comprises means for interrupting operation of the ignition system.

14. The invention of claim 10 or 13 wherein the engine comprises a throttle and wherein the controlling means comprises means for controlling the throttle in response to the control signal.

15. The invention of claim 10 wherein the selected value corresponds to an idle speed.

16. In an engine governor of the type comprising driver means, responsive to a control signal, for generating a driver signal, and actuator means, responsive to the driver signal, for controlling the speed of an engine, the improvement comprising:

first means for generating a first intermediate electronic control signal which varies as a function of the difference between the speed of a first device driven by the engine and a first threshold;

second means for generating a second intermediate electronic control signal which varies as a function of the difference between the speed of a second device driven by the engine and a second threshold; and third means, responsive to the first and second intermediate electronic control signals, for generating the control signal as a function of the one of the two intermediate control signals indicative of a lower engine speed;

said first means mounted as a modular unit readily connected to and removed from the engine governor;

said third means operative to generate the control signal in a manner conducive to effective control of the speed of the engine both when both the first and second means are coupled to the third means, and when the first means is disconnected from the engine governor.

17. The invention of claim 16 wherein the third means comprises:

first and second input terminals and an output terminal;

means for connecting the first and second input terminals to the output terminal via respective first and second rectifiers;

means for applying the first and second intermediate control signals to the first and second input terminals, respectively; and means for connecting the output terminal to the driver means to transmit the control signal thereto.

18. The invention of claim 16 wherein the first and second rectifiers comprise first and second diodes, respectively.

19. In an engine governor of the type comprising driver means, responsive to a control signal, for generating a driver signal, and actuator means, responsive to the driver signal, for controlling the speed of an engine, the improvement comprising:

first means for generating a first intermediate electronic control signal which varies as a function of the difference between the speed of a first device driven by the engine from a first threshold;

second means for generating a backup intermediate control signal which also varies as a function of the difference between the speed of the first device driven by the engine and the first threshold;

third means, responsive to the first and second intermediate electronic control signals, for generating the control signal as a function of the one of the two intermediate control signals indicative of a lower engine speed;

said second means mounted as a modular unit readily connected to and removed from the engine governor;

said third means operative to generate the control signal in a manner conducive to effective control of the speed of the engine when the first and second means are connected to the third means, and when the second means is disconnected from the engine governor.

* * * * *